US010255512B2

(12) United States Patent
Pham et al.

(10) Patent No.: US 10,255,512 B2
(45) Date of Patent: Apr. 9, 2019

(54) METHOD, SYSTEM AND APPARATUS FOR PROCESSING AN IMAGE

(71) Applicant: CANON KABUSHIKI KAISHA, Tokyo (JP)

(72) Inventors: Quang Tuan Pham, North Ryde (AU); Geoffrey Richard Taylor, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/972,771

(22) Filed: Dec. 17, 2015

(65) Prior Publication Data
US 2016/0180547 A1 Jun. 23, 2016

(30) Foreign Application Priority Data
Dec. 22, 2014 (AU) .................................. 2014277855

(51) Int. Cl.
| G06K 9/00 | (2006.01) |
| G06K 9/32 | (2006.01) |
| H04N 7/18 | (2006.01) |
| G06T 7/68 | (2017.01) |

(52) U.S. Cl.
CPC .............. G06K 9/3241 (2013.01); G06T 7/68 (2017.01); H04N 7/181 (2013.01); H04N 7/183 (2013.01); G06T 2207/10016 (2013.01); G06T 2207/10024 (2013.01); G06T 2207/30196 (2013.01); G06T 2207/30232 (2013.01)

(58) Field of Classification Search
CPC combination set(s) only.
See application file for complete search history.

(56) References Cited

U.S. PATENT DOCUMENTS

| 5,487,116 A | | 1/1996 | Nakano et al. |
| 6,166,745 A | * | 12/2000 | Saito .......................... G06T 7/68 |
| | | | 345/441 |
| 8,045,759 B2 | | 10/2011 | Mizutani et al. |
| 8,340,378 B2 | | 12/2012 | Knapp et al. |
| 8,565,482 B2 | | 10/2013 | Ding et al. |
| 2005/0152588 A1 | * | 7/2005 | Yoshida ................ G06T 7/0012 |
| | | | 382/128 |

(Continued)

FOREIGN PATENT DOCUMENTS

AU    2011265494 A1    7/2013

OTHER PUBLICATIONS

Farenzena, et al., "Person Re-Identification by Symmetry-Driven Accumulation of Local Features", In Computer Vision and Pattern Recognition (CVPR), 2010 IEEE Conference on, pp. 2360-2367, IEEE, 2010.

(Continued)

*Primary Examiner* — Alex Kok S Liew
(74) *Attorney, Agent, or Firm* — Canon U.S.A., Inc. I.P. Division

(57) ABSTRACT

A method of determining a vertical medial axis of an object in an input image, is disclosed. A measure of horizontal symmetry is determined for each pixel of the image. First and second vertical bounds within the image are determined. A continuous path between the first and second vertical bounds is determined based on the horizontal symmetry measure, the continuous path representing the vertical medial axis of the object.

11 Claims, 15 Drawing Sheets

(56) References Cited

U.S. PATENT DOCUMENTS

| | | | |
|---|---|---|---|
| 2007/0058879 A1* | 3/2007 | Cutler | G06T 5/006 |
| | | | 382/254 |
| 2007/0201728 A1* | 8/2007 | Monro | G06K 9/00597 |
| | | | 382/117 |
| 2009/0066490 A1* | 3/2009 | Mitzutani | G06K 9/00362 |
| | | | 340/435 |
| 2009/0141940 A1 | 6/2009 | Zhao et al. | |
| 2010/0104158 A1 | 4/2010 | Shechtman et al. | |
| 2015/0339527 A1 | 11/2015 | Plummer et al. | |
| 2016/0180196 A1 | 6/2016 | Taylor | |

OTHER PUBLICATIONS

Cheng, et al., "Person Re-identification by Articulated Appearance Matching", In Person Re-Identification, pp. 139-160, Springer London, 2014.

"Cross-correlation", From Wikipedia, the free encyclopedia, https://en.wikipedia.org/wiki/Cross-correlation, last modified on Nov. 9, 2015.

"Dynamic programming", From Wikipedia, the free encyclopedia, https://en.wikipedia.org/wiki/Dynamic_programming, last modified on Nov. 24, 2015.

"Image gradient", From Wikipedia, the free encyclopedia, https://en.wikipedia.org/wiki/Dynamic_programming, last modified on Oct. 29, 2015.

Koestinger, et al., "Large Scale Metric Learning from Equivalence Constraints", In Computer Vision and Pattern Recognition (CVPR), 2012 IEEE Conference on, pp. 2288-2295, IEEE, 2012.

Mazzon, et al., "Person re-identification in crowd", Pattern Recognition Letters 33, No. 14, pp. 1828-1837, 2012.

Weinberger, et al.,"Distance Metric Learning for Large Margin Nearest Neighbor Classification", In Advances in Neural Information Processing Systems, pp. 1473-1480, 2005.

Yang, et al., "Local Difference Binary for Ultra-fast and Distinctive Feature Description", Pattern Analysis and Machine Intelligence, IEEE Transactions on 36, No. 1, pp. 188-194, 2014.

Gabor filter, From Wikipedia, the free encyclopedia, https://en.wikipedia.org/wiki/Gabor_filter, last modified on Oct. 19, 2015.

Convolution, From Wikipedia, the free encyclopedia, https://en.wikipedia.org/wiki/Convolution_kernel#Fast_convolution_algorithms, last modified on Dec. 7, 2015.

Hue, From Wikipedia, the free encyclopedia, https://en.wikipedia.org/wiki/Hue, last modified on Nov. 26, 2015.

Frequency (statistics), From Wikipedia, the free encyclopedia, https://en.wikipedia.org/wiki/Frequency_(statistics), last modified on Jul. 23, 2015.

Kernel density estimation, From Wikipedia, the free encyclopedia, https://en.wikipedia.org/wiki/Kernel_density_estimation, last modified on Nov. 30, 2015.

Mixture model, From Wikipedia, the free encyclopedia, https://en.wikipedia.org/wiki/Mixture_model#Gaussian_mixture_model, last modified on Nov. 13, 2015.

Earth mover's distance, From Wikipedia, the free encyclopedia, https://en.wikipedia.org/wiki/Earth_mover's_distance, last modified on Nov. 6, 2015.

Thresholding (image processing), From Wikipedia, the free encyclopedia, https://en.wikipedia.org/wiki/Thresholding_(image_processing), last modified on Nov. 17, 2015.

Heaviside step function, From Wikipedia, the free encyclopedia, https://en.wikipedia.org/wiki/Heaviside_step_function, last modified on Nov. 23, 2015.

Mahalanobis distance, From Wikipedia, the free encyclopedia, https://en.wikipedia.org/wiki/Mahalanobis_distance, last modified on Nov. 9, 2015.

Principal component analysis, From Wikipedia, the free encyclopedia, https://en.wikipedia.org/wiki/Principal_component_analysis, last modified on Dec. 7, 2015.

Image segmentation, From Wikipedia, the free encyclopedia, https://en.wikipedia.org/wiki/Image_segmentation, last modified on Nov. 19, 2015.

Jack's Basement Insulation Info, http://www.pedestrian-detection.com/, Jack's Basement Insulation Info, 2015.

Euclidean distance, From Wikipedia, the free encyclopedia, https://en.wikipedia.org/wiki/Euclidean_distance, last modified on Sep. 8, 2015.

Taxicab geometry, From Wikipedia, the free encyclopedia, http://en.wikipedia.org/wiki/Manhattan_distance (also located at https://en.wikipedia.org/wiki/Taxicab_geometry), last modified on Aug. 21, 2015.

Nonlinear dimensionality reduction, From Wikipedia, the free encyclopedia, https://en.wikipedia.org/wiki/Nonlinear_dimensionality_reduction#Locally-linear_embedding, last modified on Nov. 14, 2015.

Satta, et al., "Exploiting Dissimilarity Representations for Person Re-identification", pp. 275-289, Sep. 2011.

* cited by examiner

Cost Map

Parent Map

METHOD, SYSTEM AND APPARATUS FOR PROCESSING AN IMAGE

REFERENCE TO RELATED PATENT APPLICATION(S)

This application claims the benefit under 35 U.S.C. § 119 of the filing date of Australian Patent Application No. 2014277855, filed 22 Dec. 2014, which is hereby incorporated by reference in its entirety as if fully set forth herein.

FIELD OF INVENTION

The present invention relates generally to image and video processing and, in particular, to matching objects between two camera views for re-identifying the objects. The present invention also relates to a method and apparatus for determining a vertical medial axis of an object in an input image, and to a computer program product including a computer readable medium having recorded thereon a computer program for determining a vertical medial axis of an object in an input image.

DESCRIPTION OF BACKGROUND ART

Public venues such as shopping centres, parking lots and train stations are increasingly subjected to surveillance with large-scale networks of video cameras. Application domains of large-scale video surveillance include security, safety, traffic management and business analytics. One example application is to have a pan, tilt and zoom camera, Camera A, tracking a target object on site. When the target object is about to move out of the physical viewing limit of Camera A, another camera, Camera B, in the same network is assigned responsibility to take over tracking the object. The change in responsibility from Camera A to Camera B is referred to as a "handoff" process. The handoff process is used with cameras with overlapping field of view. In handoff, a key task is to perform rapid and robust object matching given images from two overlapping camera views. If the field of views of the cameras A and B do not overlap, either spatially or temporally, a similar process called "object re-identification" may be performed.

Object matching from different camera viewpoints is difficult. Different cameras operate on different lighting conditions. Different objects may have similar visual appearance, and the same object (e.g., a person or a subject) can have different pose and posture across viewpoints.

One image processing method performs appearance-based object matching. Appearance-based object matching involves first determining features of a target object from a first view, then determining the same type of features of a candidate object from a second view, and then comparing the difference. If the difference is smaller than a threshold, the target object and the candidate object are said to match. Otherwise, the target object and the candidate object do not match.

One type of feature used to perform appearance-based matching is to determine the vertical symmetry of a foreground object such as an upright person. Methods that build on top of such symmetry features explore the fact that the foreground objects possess a vertical symmetry in nature. In one such method, a foreground object mask is first determined by segmenting the foreground object from the background. Next, based on a foreground object mask, the foreground object is dissected vertically into head, torso and legs sections. Then, a symmetrical axis for each section is found, resulting in a number of disjointed vertical symmetry axes. Finally, local features such as colour histograms, blob regions, and texture features around the symmetrical axes from different view points are compared and a decision is made based on the difference. One problem with the appearance-based matching method described above is that the method requires a foreground mask of the object within a bounding box. Hence the accuracy of finding a medial axis depends on the accuracy of foreground segmentation.

In addition, determining a foreground mask may be computationally and memory expensive, which may prevent the appearance-based matching method used in a resource-limited hardware environment. Another problem with the appearance-based matching method described above is that the vertical symmetry axes are broken into disjoint paths. The vertical symmetrical axes can only be detected well when the foreground object has a reasonably upright posture. The vertical symmetrical axes cannot be detected correctly when the foreground objects are tilted or foreshortened with respect to a camera sensor.

Another method uses the symmetrical nature of foreground objects by determining overall symmetrical structure of the objects (e.g., vehicles). In such a method, edge points are first determined by performing horizontally scan of an entire image. Next, a histogram of midpoint locations of all edge point pairs is determined. Then, the object midpoint is determined from a global peak of the histogram. Finally, a bounding box containing all edge-point pairs sharing the common object midpoint is determined. The determined bounding box and corresponding edge-points can be subsequently used for matching purposes. One problem is that the overall symmetrical structure method may not work for non-rigid objects like human beings. Yet another problem with known image processing methods is that the methods do not provide a confidence measure of the estimated symmetrical axes for later matching purposes.

SUMMARY OF THE INVENTION

It is an object of the present invention to substantially overcome, or at least ameliorate, one or more disadvantages of existing arrangements.

Disclosed are arrangements which seek to address the above by determining the symmetrical nature of foreground objects for use in target matching. The disclosed arrangements work well on both rigid and non-rigid objects, are robust against posture variation, and do not require costly processing steps such as foreground detection. The disclosed arrangements output features suitable for object matching while taking into account the discriminative power of different foreground areas.

According to one aspect of the present disclosure, there is provided a method of determining a vertical medial axis of an object in an input image, said method comprising: determining a measure of horizontal symmetry for each pixel of the image; determining first and second vertical bounds within the image; and determining a continuous path between the first and second vertical bounds based on the horizontal symmetry measure, the continuous path representing the vertical medial axis of the object.

According to another aspect of the present disclosure, there is provided a system for determining a vertical medial axis of an object in an input image, said system comprising: a memory for storing data and a computer program; a processor coupled to the memory for executing said computer program, said computer program comprising instructions for: determining a measure of horizontal symmetry for each pixel of the image; determining first and second vertical bounds within the image; and determining a continuous path between the first and second vertical bounds based on the horizontal symmetry measure, the continuous path representing the vertical medial axis of the object.

According to still another aspect of the present disclosure, there is provided an apparatus for determining a vertical medial axis of an object in an input image, said apparatus comprising: means for determining a measure of horizontal symmetry for each pixel of the image; means for determining first and second vertical bounds within the image; and means for determining a continuous path between the first and second vertical bounds based on the horizontal symmetry measure, the continuous path representing the vertical medial axis of the object.

According to still another aspect of the present disclosure, there is provided a non-transitory computer readable medium having stored thereon a computer program for determining a vertical medial axis of an object in an input image, said computer program comprising: code for determining a measure of horizontal symmetry for each pixel of the image; code for determining first and second vertical bounds within the image; and code for determining a continuous path between the first and second vertical bounds based on the horizontal symmetry measure, the continuous path representing the vertical medial axis of the object.

According to still another aspect of the present disclosure, there is provided a method of determining a boundary of an object in an input image, said method comprising: determining a set of medial axes of the object in the input image; determining an edge response image for the input image using the medial axes; and determining a continuous path on at least one side of the medial axes between first and second vertical bounds, the continuous path summing up to a maximum total edge response and representing at least a portion of the boundary of the object.

According to still another aspect of the present disclosure, there is provided a system for determining a boundary of an object in an input image, said system comprising: a memory for storing data and a computer program; a processor coupled to the memory for executing said computer program, said computer program comprising instructions for: determining a set of medial axes of the object in the input image; determining an edge response image for the input image using the medial axes; and determining a continuous path on at least one side of the medial axes between first and second vertical bounds, the continuous path summing up to a maximum total edge response and representing at least a portion of the boundary of the object.

According to still another aspect of the present disclosure, there is provided an apparatus for determining a boundary of an object in an input image, said apparatus comprising: means for determining a set of medial axes of the object in the input image; means for determining an edge response image for the input image using the medial axes; and means for determining a continuous path on at least one side of the medial axes between first and second vertical bounds, the continuous path summing up to a maximum total edge response and representing at least a portion of the boundary of the object.

According to still another aspect of the present disclosure, there is provided a non-transitory computer readable medium having stored thereon a computer program for determining a boundary of an object in an input image, said computer program comprising: determining a set of medial axes of the object in the input image; determining an edge response image for the input image using the medial axes; and determining a continuous path on at least one side of the medial axes between first and second vertical bounds, the continuous path summing up to a maximum total edge response and representing at least a portion of the boundary of the object.

Other aspects of the invention are also disclosed.

BRIEF DESCRIPTION OF THE DRAWINGS

One or more embodiments of the present invention will now be described with reference to the following drawings and appendices, in which.

DETAILED DESCRIPTION INCLUDING BEST MODE

Figure 1A:
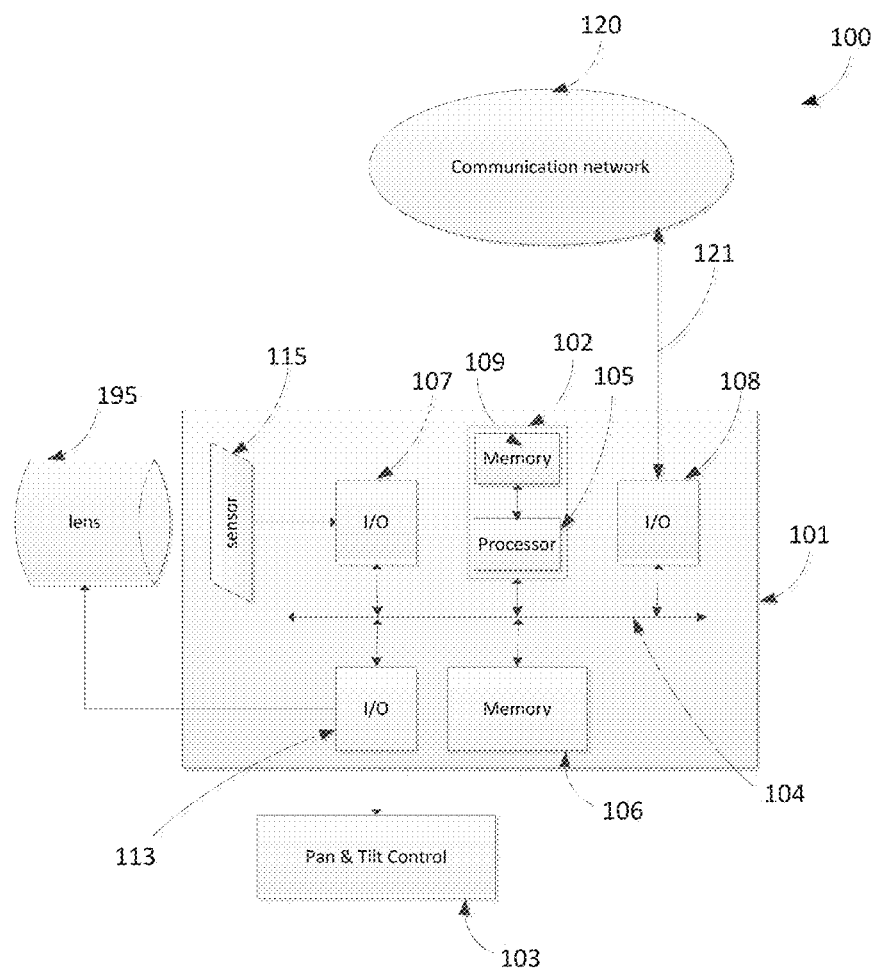
FIGS. 1A and 1B form a schematic block diagram of a camera, upon which described methods may be practiced.

Where reference is made in any one or more of the accompanying drawings to steps and/or features, which have the same reference numerals, those steps and/or features have for the purposes of this description the same function(s) or operation(s), unless the contrary intention appears.

Figure 1B:
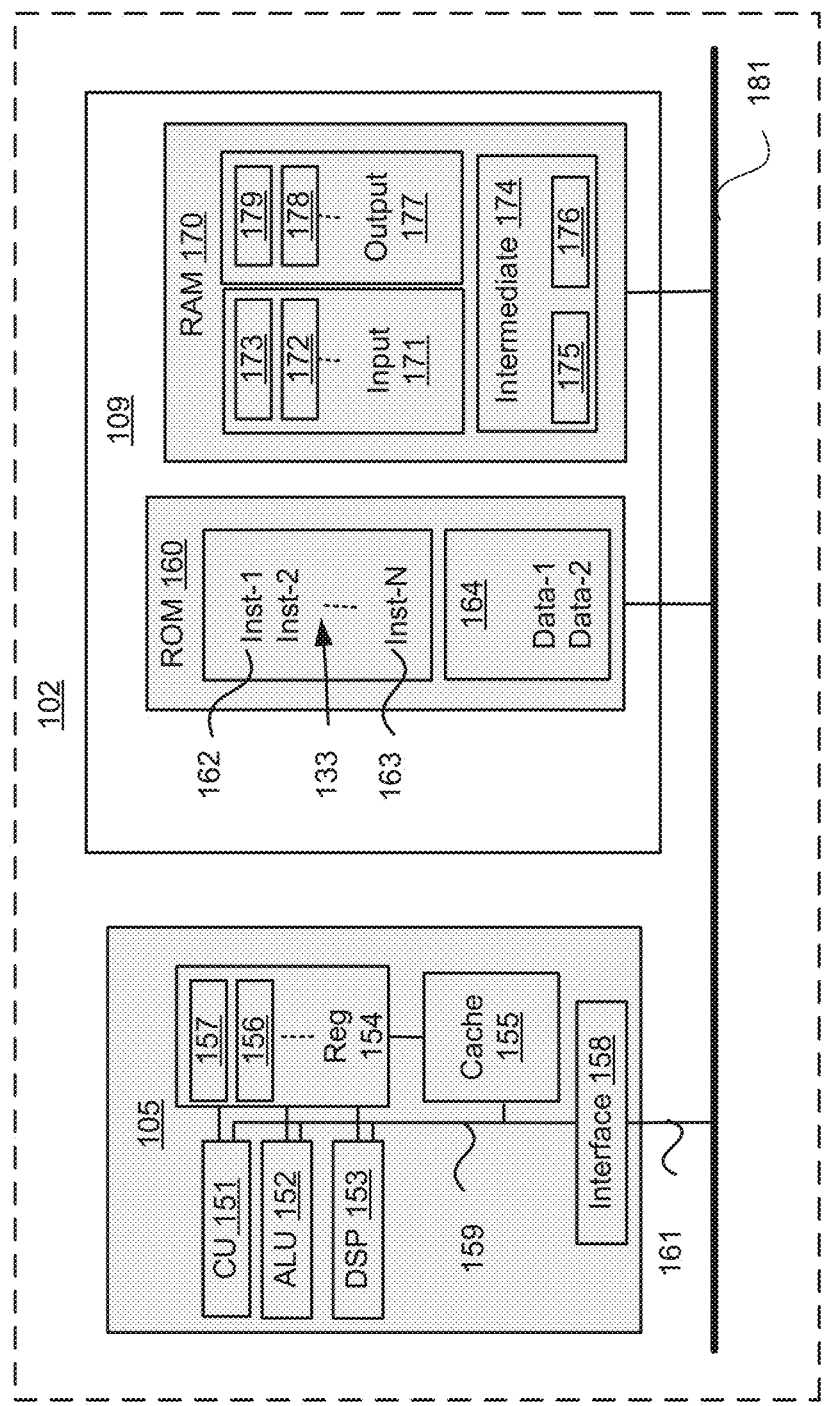

FIGS. 1A and 1B are a schematic block diagram of a camera 100, upon which described methods may be practiced. The camera 100 is a pan-tilt-zoom camera (PTZ). The camera 100 comprises a camera module 101, a pan and tilt module 103, and a lens system 195.

As seen in FIG. 1A, the camera module 101 comprises an embedded controller 102. In the present example, the embedded controller 102 includes at least one processor unit 105 (or processor) which is bi-directionally coupled to an internal storage module 109. The storage module 109 may be formed from non-volatile semiconductor read only memory (ROM) 160 and semiconductor random access memory (RAM) 170, as seen in FIG. 1B. The RAM 170 may be volatile, non-volatile or a combination of volatile and non-volatile memory.

As seen in FIG. 1A, the camera module 101 also comprises a portable memory interface 106 which is coupled to the processor 105. The portable memory interface 106 allows a complementary portable memory device to be coupled to the camera module 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The camera module 101 also comprises an input/output (I/O) interface 107 that couples to a photo-sensitive sensor array 115.

The camera module 101 also comprises a communications input/output (I/O) interface 108 that couples to a communications network 120 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

The camera module 101 also comprises an I/O interface 113 for the pan and tilt module 103 and the lens system 195.

The components, which include the sensor I/O interface 107, embedded controller 102, communications I/O interface 108, control interface 113 and memory 106 of the camera module 101, typically communicate via an interconnected bus 104 and in a manner which results in a conventional mode of operation known to those in the relevant art.

The described methods may be implemented using the embedded controller 102, where the processes of FIGS. 2 to 14 may be implemented as one or more software application programs 133 executable within the embedded controller 102. The camera module 101 of FIG. 1A implements the described methods. In particular, with reference to FIG. 1B, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the camera module 101. However, in some instances, the application programs 133 may be supplied to the user encoded on one or more CD-ROM (not shown) and read via the portable memory interface 106 of FIG. 1A prior to storage in the internal storage module 109 or in the portable memory as described above. In another alternative, the software application program 133 may be read by the processor 105 from the network 120, or loaded into the controller 102 or such portable storage medium from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the camera module 101. Examples of transitory or non-tangible computer readable transmission media that may also participate in the provision of software, application programs, instructions and/or data to the camera module 101 include radio or infra-red transmission channels as well as a network connection to another computer or networked device, and the Internet or Intranets including e-mail transmissions and information recorded on Websites and the like. A computer readable medium having such software or computer program stored thereon (i.e., recorded on it) is a computer program product.

FIG. 1B illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the camera module 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152, a digital signal processing (DSP) unit 153 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the camera module 101. Typically, the application program 133 waits for events and subsequently executes the block of code associated with that event. Events may be triggered in response to input from the interfaces 107, 108 and 113 of the camera module 101.

The execution of a set of the instructions may require numeric variables to be read and modified. Such numeric variables are stored in the RAM 170. The described methods use input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the camera module 101. The camera 100 may be used to capture input images representing the visual content of a scene appearing in the field of view of the camera 100. The visual content may include one or more foreground objects and one or more background objects.

Figure 2:
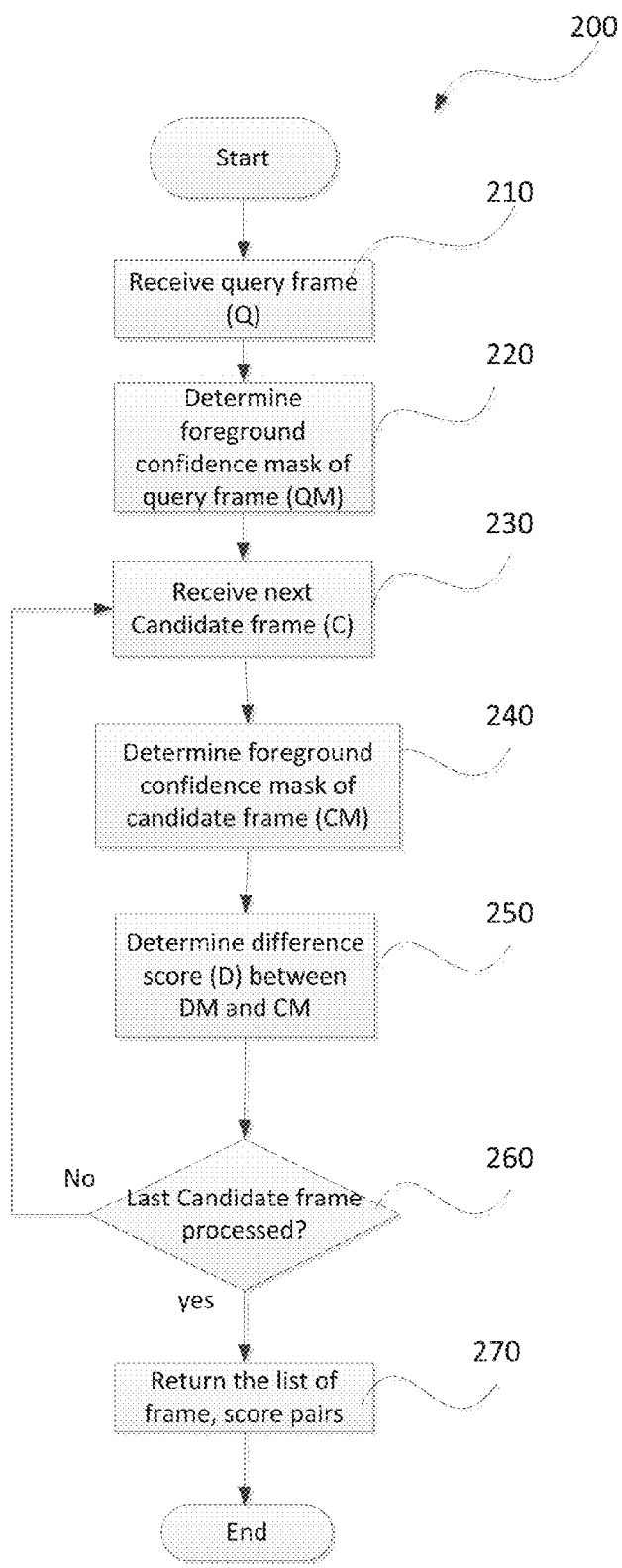
FIG. 2 is a schematic flow diagram showing a method of performing target matching.
Figure 10:
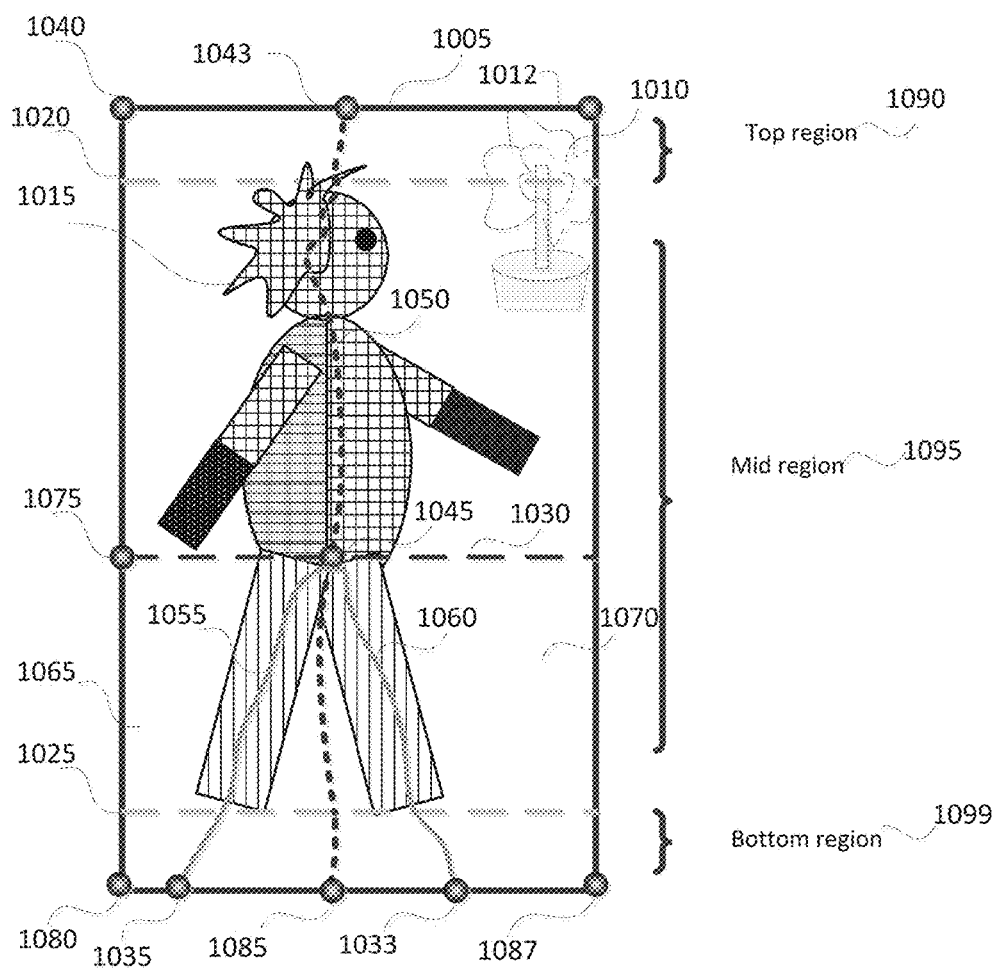
FIG. 10 is a schematic diagram showing medial axis paths for a given target object.

The camera 100 is used to capture video frames representing visual content of a scene appearing in the field of view of the camera 100. Each video frame is an image captured by the camera 100. The described methods may be configured for extracting foreground objects and matching objects across frames from different cameras. The foreground objects may also be referred to as "targets" or "target objects". Although the camera 100 is described as a PTZ camera, the described methods may be implemented as a computer program executing on any type of camera including for example static field-of-view cameras, PTZ cameras, wearable cameras and handheld cameras. FIG. 2 is a schematic flow diagram showing a method 200 of performing target matching. The method 100 performs target matching between two video frames. Each of the frames may represent a different view of the camera 100. As described here, the term "frame" refers to a portion of a video image captured by the camera 100 where boundaries of the image portion define a "tight crop" around an object of interest (OOI) within the image captured by the camera 100. To be considered a tight crop, the object of interest occupies more than 50% of the frame. For example, FIG. 10 shows an example frame 1005 which represents a tight crop of an object of interest representing a person 1015. The frame 1005 may be received at step 210 from the storage module 109.

The method 200 may be implemented as one or more code modules of the software application program 133 resident in the storage module 109 of the camera 100 and being controlled in its execution by the processor 105.

The method 200 described below will be described by way of example with reference to the frame 1005 and the object of interest representing a person 1015.

The method 200 begins at receiving step 210, where a query frame (Q) is received by the processor 105. The query frame (Q) may be received at step 210 from the storage module 109. The query frame (Q) is a portion of an image captured by the camera 100 where boundaries of the image portion defining the query frame (Q) define a tight crop around an object of interest (OOI) such as the object of interest 1015 of the frame 1005. The query frame (Q) represents a view of the object of interest (OOI) in an image captured by the camera 100 in the present example. Typically, one query frame (Q) is used for executing the method 200. However, in one arrangement a plurality of query frames may be used.

Then at mask determining step 220, a foreground confidence mask of the query frame Q is determined. The foreground confidence mask of the query frame may be referenced here as "QM". A foreground confidence mask is a foreground mask where background is encoded with a value zero (0) and foreground is encoded with a value of non-zero. In addition, a foreground confidence mask encodes a different value indicating confidence level of a specific area of the foreground mask being foreground. A method 300 of determining a confidence mask, as executed at step 220, will now be described with reference to FIG. 3.

At receiving step 230, a candidate frame (C) is received by the processor 105. The candidate frame C may be received at step 230 from the storage module 109. The candidate frame C is also a portion of an image captured by the camera 100 where boundaries of the image portion define a tight crop around an object of interest (OOI) such as the object of interest 1015 of the frame 1005. As described here, one or more candidate frames (C) are used in the execution of the method 200. Each candidate frame (C) represents a view of an object of interest (OOI) in an image captured by the camera 100 in the present example. The object of interest (OOI) in each candidate image may or may not be the same as the object of interest (OOI) in the query frame (Q) received at step 210.

Then at mask determining step 240, a confidence mask is determined for the candidate frame C using the method 300. The confidence mask of the candidate frame may be referenced here as "CM". Next, a difference score (D) between foreground confidence mask QM and confidence mask CM is determined at score determining step 250. The higher the difference score (D) determined at step 250, the higher the likelihood is that the object of interest in the candidate frame (C) received at step 230 is the same object of interest (OOI) in the query frame (Q) received at step 210.

Then at decision step 260, if all candidate frames are processed then the control flow moves to a return step 270. Otherwise, the method 200 returns to step 230. At step 270, all scores coupled with the candidate frames are returned for final matching evaluation under execution of the processor 105. One method of determining if the candidate frame C matches query frame Q is to compare the difference score to a threshold value. When the difference score is lower than the threshold value, the candidate frame C matches the query frame Q.

Figure 3:
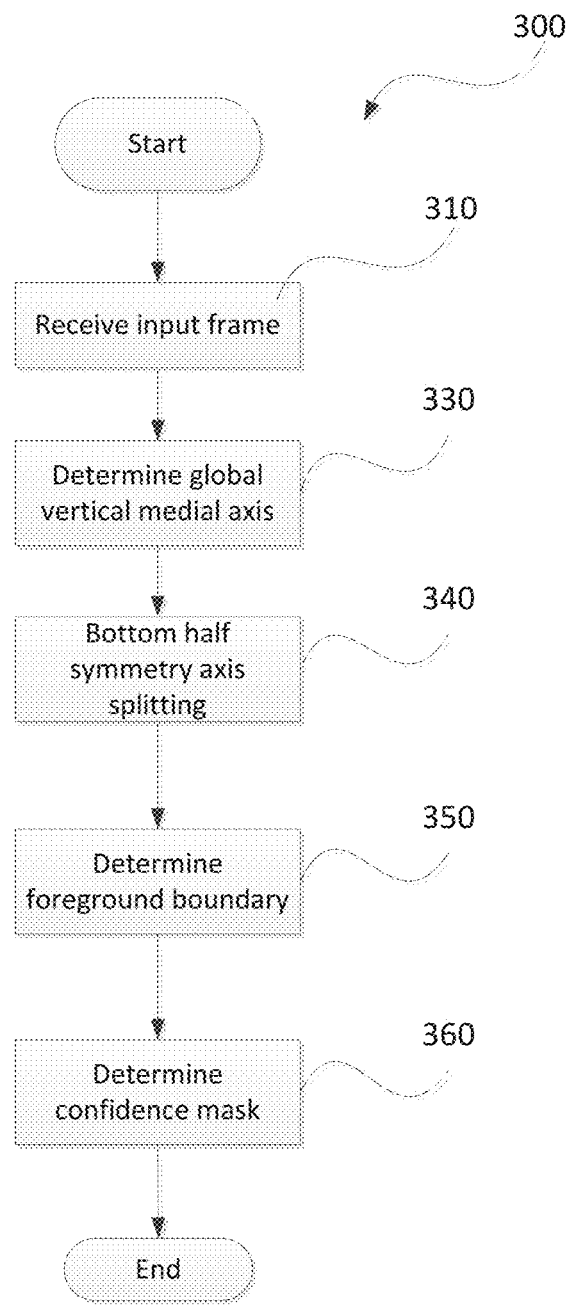
FIG. 3 is a schematic flow diagram showing a method for determining a confidence mask, as executed in the method of FIG. 2.

The method 300 of determining the confidence mask of an input frame, as executed at steps 220 and 250, will now be described with reference to FIG. 3. The method 300 is described by way of example where the target object 1015 within the input frame 1005 is a person. As described below, the frame 1005 may be divided into multiple adjoining regions, each region having a medial axis. As also described, the medial axes of adjoining regions may be connected via a pixel bound at boundaries of the adjoining regions.

The method 300 may be implemented as one or more code modules of the software application program 133 resident in the storage module 109 of the camera 100 and being controlled in its execution by the processor 105.

The method 300 begins at receiving step 310, where the input frame 1005 is received by the processor 105. The input frame 1005 is either a query frame as in step 210, or a candidate frame as in step 220.

Next, at medial axis determining step 330, a vertical medial axis of the target object 1015 within the input frame 1005 is determined under execution of the processor 105. The vertical medial axis enforces a continuous path. The vertical medial axis is determined between the top row (i.e., a first vertical bound) and the bottom row (i.e., a second vertical bound) of the input frame 1005. One method determining the medial axis at step 330 is to determine a maximum cost path between the top and bottom of a cost image determined from the input frame 1005. In one arrangement, dynamic programming is used to determine the maximum cost path. A method 400 of determining the vertical medial axis, as executed at step 330, will be described below with reference to FIG. 4.

Next, at splitting point step 340, a symmetry axis splitting point (or simply "split point") at torso-legs junction of the target object 1015 is determined. Two additional medial axis paths starting from the split point to the bottom of the input frame 1005 are also determined at step 340. The additional medial axes go through the middle of the legs of the person represented by the target object 1015. A method 1100 of determining medial axis paths at the bottom half of a target object, as executed at step 340, will be described below with reference to FIG. 11.

Next, at determining step 350, the foreground boundary of the input frame 1005 is determined based on the medial axes determined at step 340. The foreground boundary defines a foreground mask, which contains only the target object (or object of interest) 1015, not the background. The foreground mask is determined at step 350 using the foreground boundary is a foreground mask of the object 1015. A method 1200 of determining the foreground boundary of the target object 1015, as executed at step 350, will be described below with reference to FIG. 12.

The method 300 concludes at confidence value determining step 360, where a confidence value for each pixel in the foreground mask is determined to form a foreground confidence mask. The foreground confidence mask is determined at step 360 using the confidence value. The confidence value for each pixel may be referred to as a "confidence score".

Figure 4:
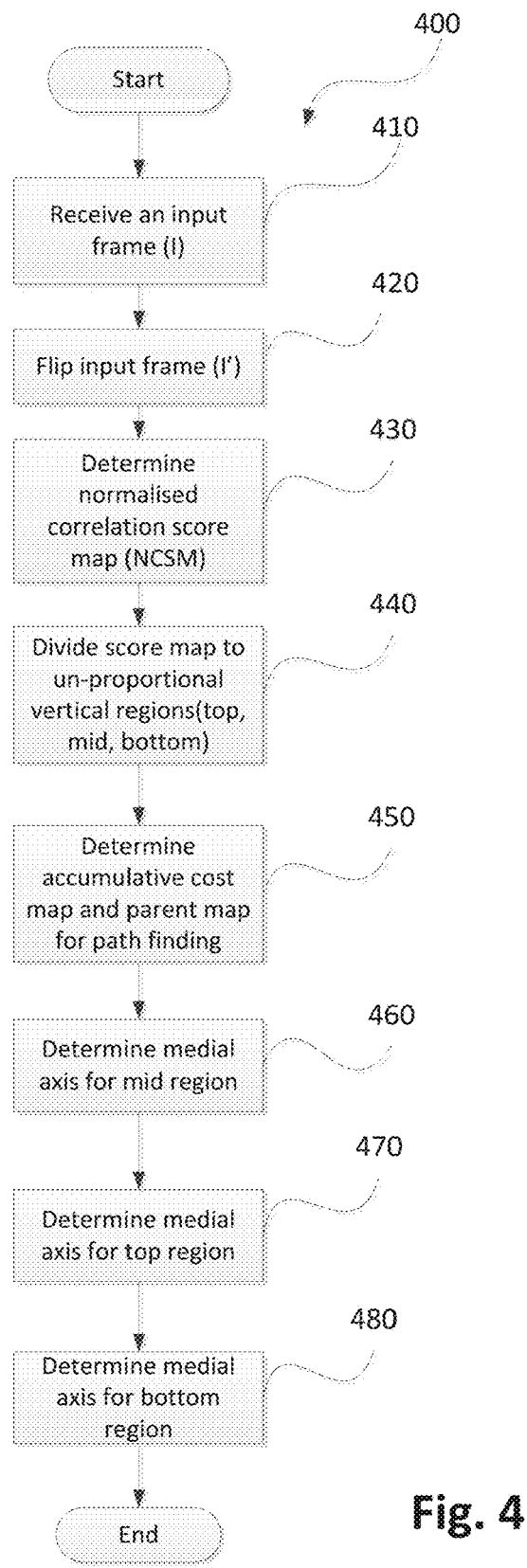
FIG. 4 is a schematic flow diagram showing a method of determining a vertical medial axis, as executed in the method of FIG. 3.
Figure 5:
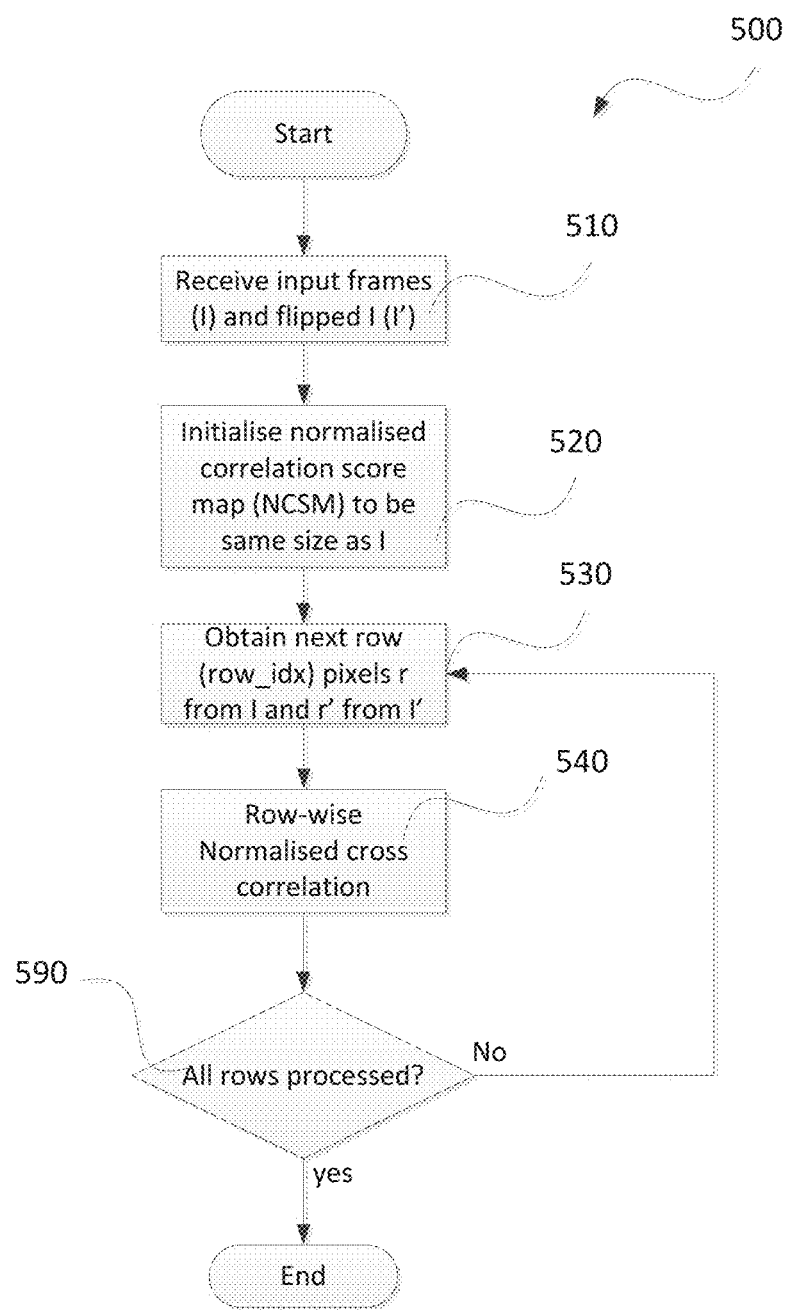
FIG. 5 is a flow diagram showing a method of determining a normalised cross correlation score map (NCSM), using row-wise normalised cross correlation of a target object, as executed in the method of FIG. 4.

The method 400 of determining a vertical medial axis of the target object, as executed at step 330, will now be described with reference to FIG. 4. In the arrangement of FIG. 4, the method 400 uses dynamic programming. As described below, each pixel on the vertical medial axis is associated with a confidence score being a normalised cross correlation score for a corresponding image row.

The method 400 may be implemented as one or more code modules of the software application program 133 resident in the storage module 109 of the camera 100 and being controlled in its execution by the processor 105. The method 400 will be described by way of example with reference to the target object 1015 within the input frame 1005.

The method 400 begins at receiving step 410, where the input frame 1005, in a suitable colour space, is received by the processor 105. In one arrangement, the input frame 1005 is pre-processed in an opponent colour space to have zero mean per colour channel and a reduced luminance compared to chrominance. For example, the colour space used at step 410 is a de-correlated or opponent colour space, such as the CIE Lab or YCbCr colour space, so that each channel of the colour space can be manipulated separately without affecting other channels.

The luminance channel Y of the colour space used at step 410 is divided by eight to reduce the effect of lighting change during target matching. Dividing the luminance channel Y of the colour space by eight also effectively boosts the contribution of the chrominance channels Cb and Cr in target matching. Colours may be used for matching across images. The colour channels of the colour space used at step 410 are zero-mean for normalised cross correlation.

For a better focus of a subsequent correlation step on the target object, the zero-mean input intensities can be optionally modulated (i.e. multiplied) by an object localisation weight. The input frame 1005 may be pre-processed by modulating the input frame 1005 by an object localisation weight to emphasise the processing on the object foreground object. The non-negative object localisation weight may be high (i.e. close to 1) where the foreground object is located in the input frame. The non-negative object localisation weight may be low (i.e. close to 0) at the background pixels of the input frame. Such object localisation weight can be derived from a human body detection step or head detection step for a human target. For example, to enable a medial axis to go through the head of a person, the top 20% image rows of the input frame (e.g., the frame 1005) containing a representation of the person are multiplied with the output of a skin colour detector. The skin colour detector outputs a probability of skin 0≤Pr(skin)≤1 at each pixel in the frame (or image). After colour transformation, intensity normalisation, and object localisation weighting of the input frame 1005, a pre-processed input image I is created at step 410.

Then at flipping step 420, the input image I created at step 410 is horizontally flipped, resulting in a flipped image I'. At determining step 430, a normalised cross-correlation score map (NCSM) is determined for the image I and the flipped image I' under execution of the processor 105. A method 500 of determining a normalised cross correlation score map (NCSM), as executed at step 430, will be described in detail below with reference to FIG. 5. The normalised cross correlation score map (NCSM) is determined by performing a row-wise normalised cross correlation. The determined normalised cross correlation score map (NCSM) may be stored in memory 106.

Next at dividing step 440, the normalised cross-correlation score map (NCSM) is virtually divided up into a number of vertical regions using a set of vertical bounds. In one arrangement, first and second vertical bounds are determined at step 440. The vertical bounds are determined within the frame 1005. As described below, each of the vertical bounds may be a whole image row of the frame 1005 or a single pixel on the image row of the frame 1005.

Figure 8:
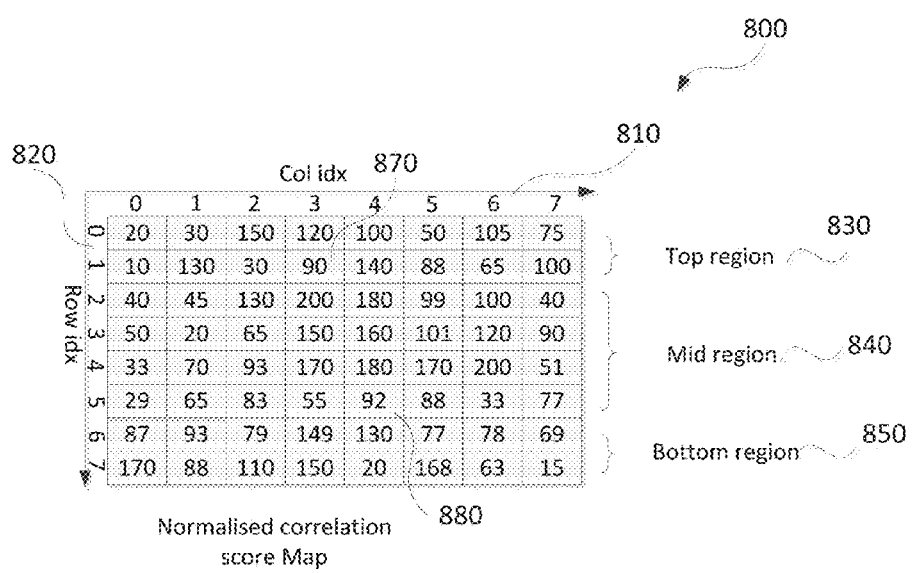
FIG. 8 shows an example normalised correlation score map.

In an arrangement where first and second vertical bounds are determined, the number of vertical regions of the normalised cross-correlation score map is three (3), where the vertical regions are named top, middle and bottom regions, accordingly. As an example, FIG. 8 shows a normalised cross correlation score map (NCSM) 800 with eight (8) rows 820 and eight (8) columns 810 determined for the frame 1005 of FIG. 10. The normalised cross correlation score map (NCSM) 800 comprises a matrix 870 of values with each value representing a correlation score. The values in matrix 870 are examples of output of the normalised cross correlation score map (NCSM) determining step 430. Each of the values in matrix 870 of the map 800 is a measure of horizontal symmetry for each pixel of the image I determined for the frame 1005. The horizontal symmetry measure for pixels on an image row of the image I is a normalised cross correlation of the image row with a horizontally flipped version of the image row from the flipped image I'.

The matrix 870 of the normalised cross correlation score map (NCSM) 800 is shown to be divided up into a top region 830, middle region 840 and bottom region 850 as at step 440 with each of the regions 830, 840 and 850 having a corresponding region 1090, 1095 and 1099, respectively, in the frame 1005. The middle region 840 of the normalised cross-correlation score map 800 contains values for a majority portion of the target object (or object of interest) 1015 within middle region 1095 of the input frame 1005. For example, middle region 1095 of the frame 1005, as shown in FIG. 10, contains a majority portion of the target object (or object of interest) 1015. The top region 830 and bottom region 850 of the normalised cross-correlation score map (NCSM) 800 contain values for the top region 1090 and bottom region 1099, respectively, of input frame 1005. The top region 1090 and bottom region 1099 of input frame 1005 correspond to uncertainty regions of the frame 1005. In an uncertainty region, such as region 1090, the region is considered to contain mostly background, such as a top part of flower 1010 in frame 1005.

Since the middle region 1095 of the frame 1005, for example, contains the target object 1015, an estimate of the symmetrical axis of the object 1015 within the middle region 1095 is more likely to be correct. The symmetrical axis or medial axis can then be extended from the middle region 1005 to the top region 1090 and bottom region 1099. One method of determining the proportion of the frame 1005 defining the middle region 1095 is to use heuristic values. For example, the middle region 1095 of the input frame 1005 occupies 80% of the input frame 1005, while the top region 1090 and bottom region 1099 occupies 10% of the input frame 1005, respectively. Using such example heuristic values, the first vertical bound described above is the image row at the 10% image height location of frame 1005, and the second vertical bound described above is the image row at the 90% image height location of frame 1005.

Figure 9A:
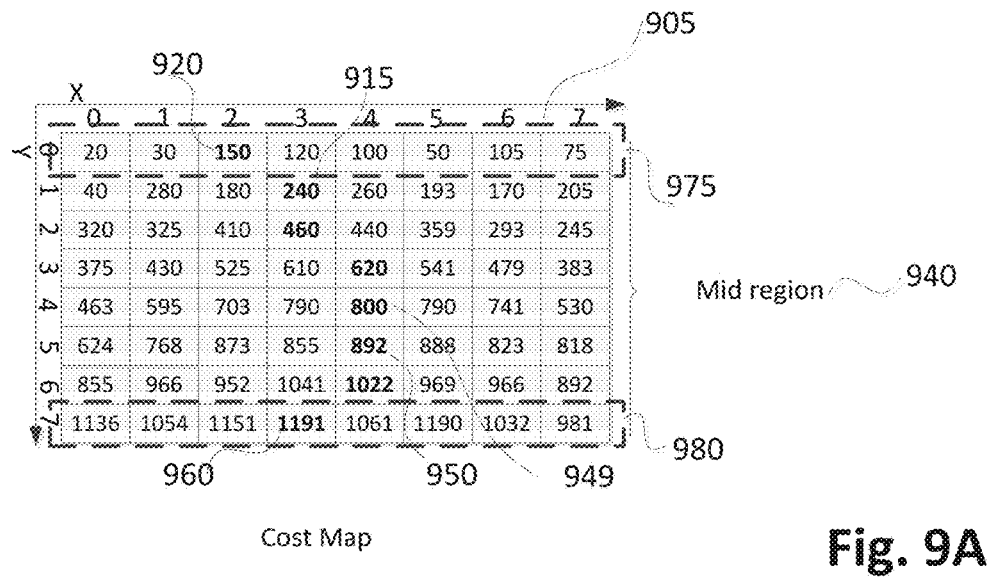
FIG. 9A is a schematic diagram showing an accumulated cost map.
Figure 9B:
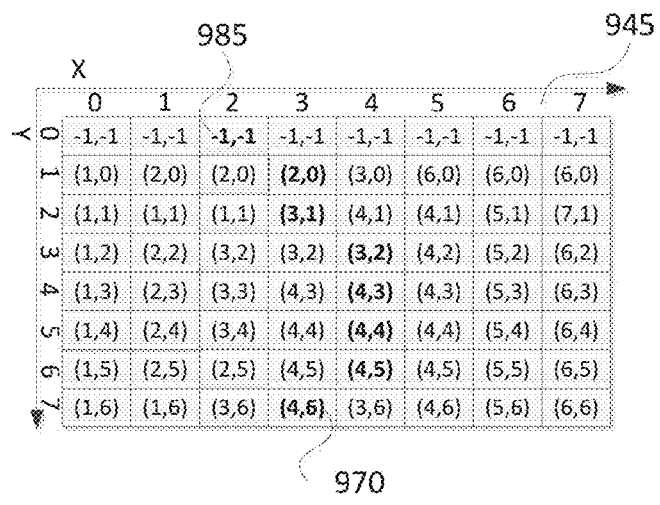
FIG. 9B is a schematic diagram showing a parent map.

Then at determining step 450, an accumulated cost map (ACM) and parent map (PM) are determined from the normalised cross-correlation score map (NCSM) 800, in a top down fashion, under execution of the processor 105. The accumulated cost map (ACM) and parent map (PM) are determined using row wise normalised cross correlation of a target object. FIGS. 9A and 9B shows an accumulated cost map 905 and parent map 945, respectively, determined from the normalised cross-correlation score map (NCSM) 800. A method 600 of determining an accumulated cost map (ACM) and parent map (PM), as executed at step 450, will be described in detail below with reference to FIG. 6.

Next at determining step 460, the cost path in the middle region 1095 of the input frame 1005 is determined using the accumulated cost map (ACM) 905 and parent map (PM) 945 determined at step 450. The cost path represents a medial axis for the middle region 1095 of the input frame 1005. The cost path is a continuous path that sums up to a maximum total symmetry measure in the normalised cross-correlation score map (NCSM) 800. A method 700 of determining a path, as executed at step 460, will be described in detail below with reference to FIG. 7.

Steps 450 and 460 may be collectively referred to as maximum cost path finding using dynamic programming.

Then at determining step 470, the medial axis of the middle region 1095 of the frame 1005 is extended to cover the top region 1090 of the frame 1005.

The method 400 concludes at determining step 480, where the medial axis of the middle region 1095 of the frame 1005 is extended to cover the bottom region 1099 of the frame 1005.

The method 500 of determining the normalised cross correlation score map (NCSM) 800, as at step 430, by performing a row-wise normalised cross correlation will now be described. As described above, the normalised cross correlation score map (NCSM) 800 contains values representing a measure of horizontal symmetry for each pixel of an image. A continuous path summing up to a maximum total symmetry measure is determined from the map 800, the continuous path representing a medial axis. The method 500 may be implemented as one or more code modules of the software application program 133 resident in the storage module 109 of the camera 100 and being controlled in its execution by the processor 105.

The method 500 begins at step 510, where the two input images: input frame I and the flipped image I' determined for the frame 1005 are received. The two input images I and I' may be accessed from the memory 106.

At initialising step 520, the normalised cross correlation score map (NCSM) is initialised to the same size (i.e., the same width by height) as the input images I and the flipped image I', under execution of the processor 105. All values in the normalised cross correlation score map (NCSM) are set to the value zero (0) at step 520. Next at obtaining step 530, the next row of pixel values r from image I and r' from flipped image I' are obtained. The row pixel values obtained at step 530 is characterised by a row index variable, row_idx. At determining step 540, row-wise normalised cross correlation scores are determined from the pixel values of r from image I and pixel value r' flipped image I' using Equation (1), as follows:

$$\frac{r * r'}{\sqrt{\Sigma(r)^2 \times \Sigma(r')^2}} = \frac{r * r'}{\Sigma(r)^2} \quad (1)$$

where the numerator of Equation (1) determines the cross correlation (denoted with symbol *) between input row r from image I and row r' from image I'. In the denominator of Equation (1), since values in row r' is a horizontal flip of row r, the normalisation value $\sqrt{\Sigma(r)^2 \times \Sigma(r')^2}$ is the same as $\Sigma(r)^2$ (where $\Sigma$ denotes sum of values over the row). The row-wise normalised cross correlation scores determined at step 540, have the same number of elements as row r, and are copied into the normalised cross-correlation score map at NCSM [row_idx].

Next, the method 500 proceeds to decision step 590, where if all rows in image I and flipped image I' are processed, then the method 500 of determining the normalised cross correlation score map concludes. Otherwise, the method 500 returns to step 530.

Figure 6:
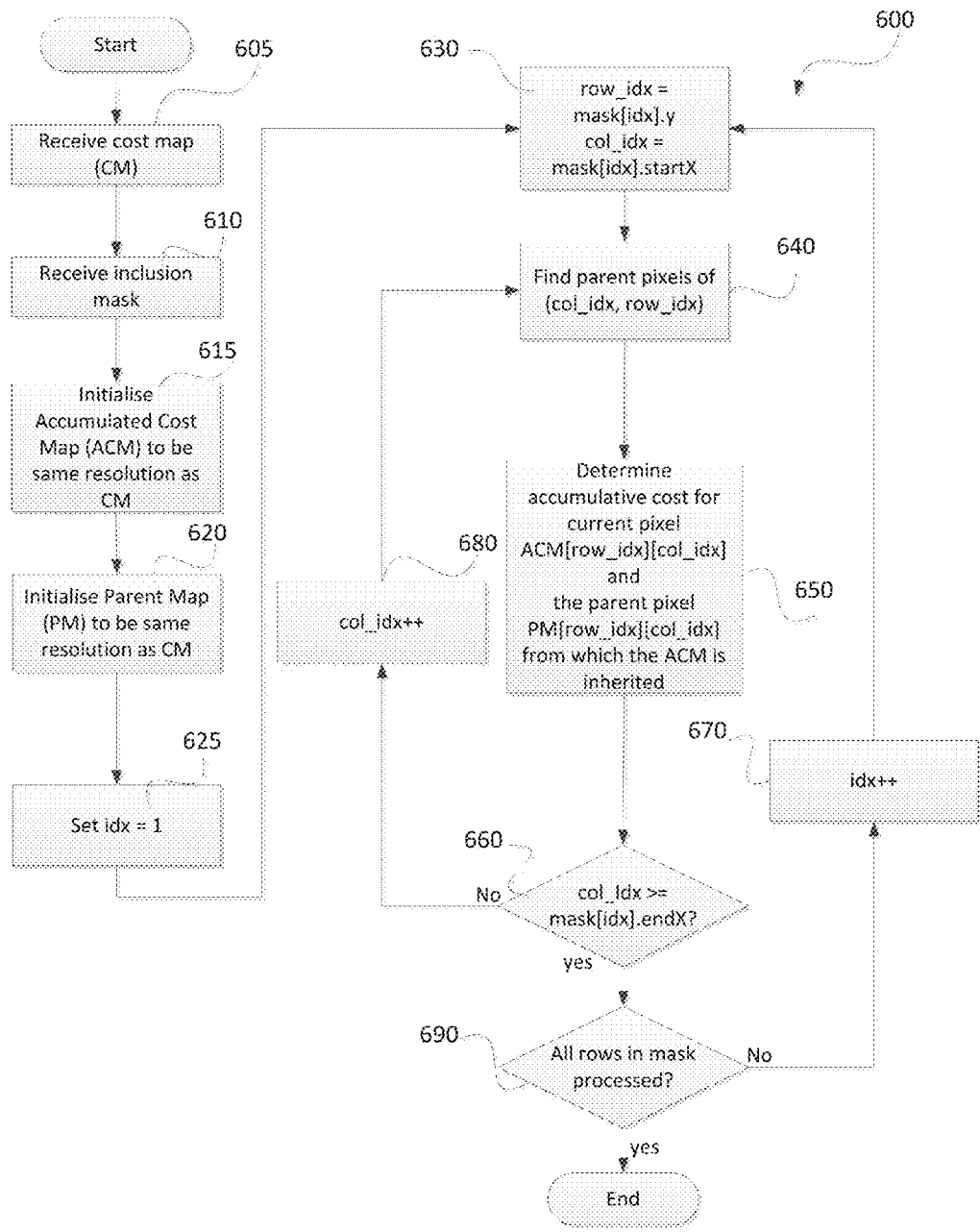
FIG. 6 is a flow diagram showing a method of determining an accumulated cost map (ACM) and parent map (PM), as executed in the method of FIG. 4.

The method 600 of determining an accumulative cost map (ACM) and parent map (PM), as executed at step 450, will be described in detail below with reference to FIG. 6. The method 600 may be implemented as one or more code modules of the software application program 133 resident in the storage module 109 of the camera 100 and being controlled in its execution by the processor 105. The method 600 will be described by way of example with reference to the two dimensional image normalised cross-correlation score map (NCSM) 800 of FIG. 8, the accumulated cost map (ACM) 905 of FIG. 9A and the parent map (PM) 945 of FIG. 9B.

The method 600 determines the accumulated cost map (ACM) 905 and corresponding parent map (PM) 945 given a cost map and an inclusion mask as inputs. In the example of FIGS. 9A and 9B, the input cost map is the two dimensional image normalised cross-correlation score map (NCSM) 800, which was determined in step 430. An inclusion mask for the cost map 800 describes a region of interest upon the cost map 800. For example, the inclusion mask can be a rough segmentation of the target object (or foreground object) in the input frame. If such foreground segmentation is not available, the inclusion mask assumes the whole image. In one arrangement, the inclusion mask is represented as an array of row index paired with a start column index and an end column index. For example, mask=[[1, 1, 10], [2, 3, 15]] describes an inclusion mask with two rows, row one (1) and row two (2). Within row one (1), the columns between one (1) and ten (10) are within the region of interest, i.e. mask[1]=[1, 1, 10]. Within row two (2) (called Y value), the region of interest span from column three (3) (called startX) to column fifteen (15) (called endX): mask[2]=[2, 3, 15] or mask[2].Y=2, mask[2].startX=3, mask[2].endX=15.

The method 600 begins at receiving step 605, where the cost map (CM) 800 is received under execution of the processor 105. The map 800 may be stored in the memory 106. Then at receiving step 610, an inclusion mask is received under execution of the processor 105. Again the inclusion mask may be stored in the memory 106.

The method 600 then proceeds to initialising step 615, where a 2-dimensional image representing the accumulated cost map (ACM) 905 is initialised under execution of the processor 105. All values in the accumulated cost map (ACM) 905 are initialised to a small numerical value, for example, zero (0). The accumulated cost map (ACM) 905 is initialised to be at the same resolution as the cost map (CM) 800 received at step 605. The initialised accumulated cost map (ACM) 905 may be stored in the memory 106.

The method 600 then proceeds to initialising step 620, where a 2-dimensional image representing the parent map (PM) 945 is initialised under execution of the processor 105. The parent map (PM) is initialised to be at the same resolution as the cost map (CM) 800 received at step 605. The initialised parent map (PM) 945 may be stored in the memory 106. Both the accumulated cost map 905 and parent map 945 have the same size as the cost map 800. All values in the parent map 945 are initialised to coordinates (−1, −1).

The accumulated cost map 905 records the total cost along a continuous maximum-cost path from top row to the current pixel location on the cost map (CM) 800. For example, as seen in FIG. 9A, the accumulated cost map 905 comprises a value eight hundred and ninety two (892) at matrix cell 950, indicating that the accumulative cost along a maximum-cost path from row 0 to the current pixel (as represented at matrix cell 950) in row five (5) is eight hundred and ninety two (892). The accumulated cost values along the continuous maximum-cost path from row 0 to the current pixel in row five (5) are shown in bold, starting from pixel (2,0) to (3,1), (3,2), (4,3), (4,4), to the current pixel (4,5). The continuous maximum-cost path runs between the first and second vertical bounds described above, with the continuous maximum-cost path representing the vertical medial axis of the object 1015 for the example frame 1005. The continuous maximum-cost path sums up to a maximum total symmetry measure for the cost map (CM) 800.

The parent map (PM) 945 records the pixel location of a pixel on the previous row that precedes the current pixel on the maximum-cost path. For example, the current pixel as represented by matrix cell 950 in FIG. 9A has pixel location (4,5) as seen in FIG. 9B and an accumulated cost value of eight hundred and ninety two (892) as seen in FIG. 9A. The preceding pixel along the maximum-cost path (i.e., as represented by the bold numbers in FIG. 9A) has location (4,4) as seen in FIG. 9B.

The accumulated cost at the current pixel represented by matrix cell 950 equals the summation of the accumulated cost at the parent pixel represented by matrix cell 949 and the cost at the current pixel as represented by matrix cell 880 in the normalised correlation score map (NCSM) 800 is as follows:

$$892=800+92.$$

Referring back to FIG. 6, the determination of the accumulative cost and parent pixel location for all pixels within the inclusion mask, continues at initialisation step 625. At step 625, variable idx is initialised to the value one 1 under execution of the processor 105. Then at initialisation step 625, variable row_idx is set to mask[idx].y and col_idx is set to mask[idx].startX under execution of the processor 105.

The method 600 then proceeds to finding step 6]40, where potential parent pixels of a given pixel coordinate (col_idx, row_idx) are found under execution of the processor 105. In one arrangement, the potential parent pixels are three (3) adjacent pixels on the previous row as follows:

parent[0]=(col_idx−1, row_idx−1),
parent[1]=(col_idx, row_idx−1), and
parent[2]=(col_idx+1, row_idx−1).

Pixel parent[1] is referred to as the direct or vertical parent and pixel parent[0] and pixel parent[2] are referred to as indirect or diagonal parents. The continuous path from pixel parent[1] to the current pixel is called a vertical move, while the continuous path from pixel parent[0] or pixel parent[2] to the current pixel is referred to as a diagonal move. The method 600 continues at determining step 650, where the accumulative cost for the current pixel (col_idx, row_idx) and the parent pixel which contributes to the accumulative cost is determined under execution of the processor 105. In one arrangement, the accumulative cost for the current pixel is a sum of the accumulated cost of the parent pixel and the value in the cost map at the current pixel. For example, in FIG. 9A, the pixel represented by matrix cell 915 at location (3,1) (as seen in FIG. 9B) has a parent pixel represented by matrix cell 920. The parent pixel represented by matrix cell 920 has a maximum value of one hundred and fifty (150) for parent pixel 920 at location (2,0). Hence, the accumulated cost at matrix cell 915 is the sum of the accumulated cost at matrix cell 920 and the cost for the current pixel represented by matrix cell 870 is as follows:

$$240=150+90.$$

In another arrangement, Equation (2), as follows, is used to determine the accumulated cost values:

$$ACM[r][c] = \max \begin{cases} ACM[\text{parent}[0]] + CM[r][c] * \text{weight\_indirect} \\ ACM[\text{parent}[1]] + CM[r][c] * \text{weight\_direct} \\ ACM[\text{parent}[2]] + CM[r][c] * \text{weight\_indirect} \end{cases} \quad (2)$$

where r represents row_idx and c represents col_idx. ACM[parent[i]] represents the accumulated cost at parent pixel parent[i] (i=0,1,2). The weights, weight_direct and weight_indirect, indicate how much the cost at the current pixel influence the accumulated cost for the current pixel.

In one arrangement, weight_direct=1.3604 and weight_indirect=0.9619, which favour a direct path by giving the direct path a higher weight than a diagonal path. An arrangement which gives the direct path a higher weight than a diagonal path encourages the maximum-cost path to comprise of more vertical moves than diagonal moves.

At step 650, the value in the parent map, PM[row_idx][col_idx], is set to the pixel location of the parent pixel corresponding to the maximum value in Equation (2), under execution of the processor 105.

Next, the method 600 proceeds to decision step 660, where if the edge of the inclusion mask for the current row has been reached, then the method 600 proceeds to decision step 690. Otherwise, the method 600 proceeds to incrementing step 680, where variable, col_idx, is incremented by one (1). The method 600 then returns to step 640.

At decision step 690, if all rows in the inclusion mask have been processed, then the method 600 concludes. Otherwise, the variable, idx, is incremented by one (1) at incrementing step 670. Following step 690, the method 600 loops back to step 630.

Figure 7:
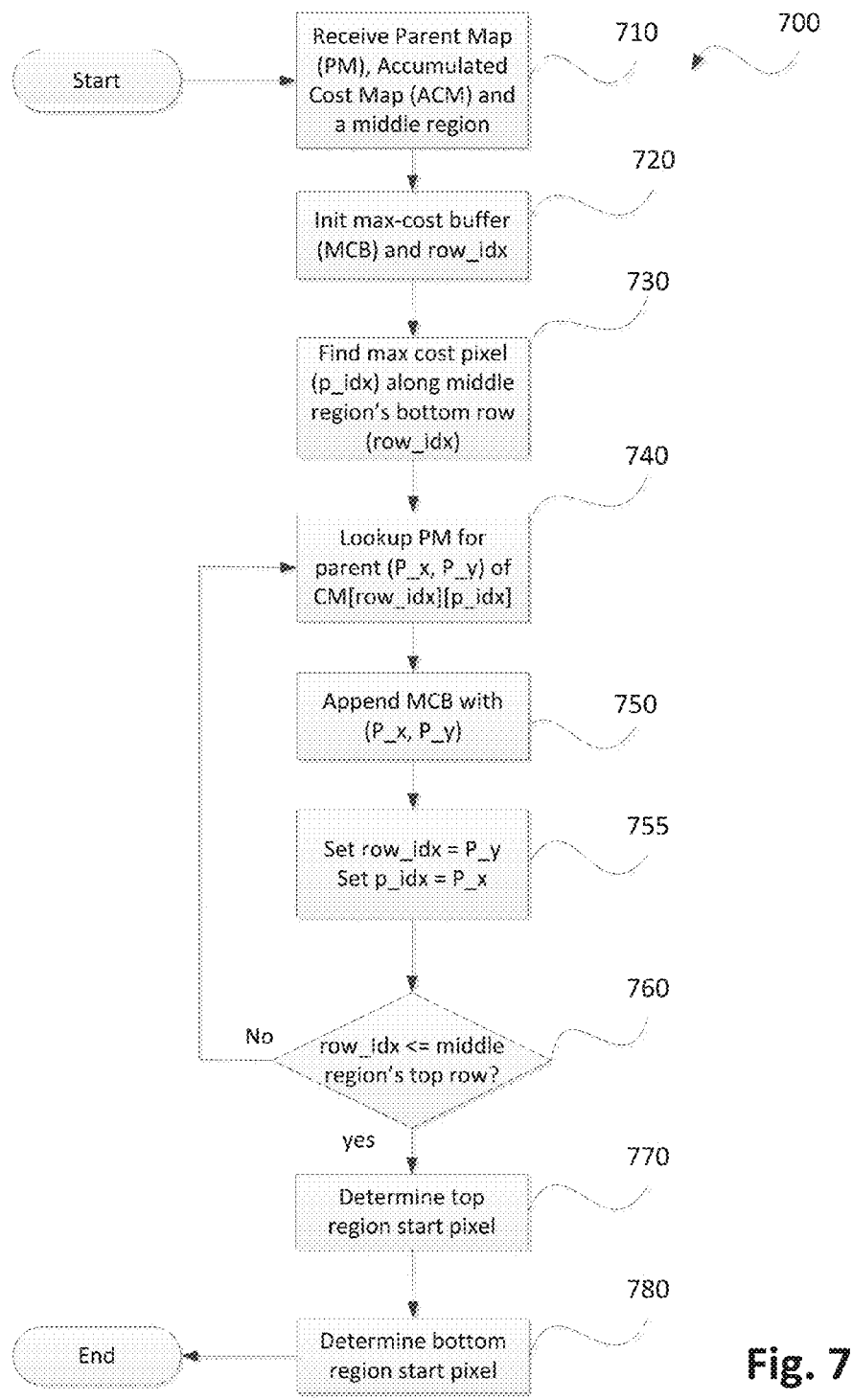
FIG. 7 is a flow diagram showing a method of determining an optimal path in a section of the image.

The method 700 of determining a cost path, as executed at step 460, will now be described with reference to FIG. 7. The method 700 determines the maximum-cost path from the accumulated cost map determined at step step 450. The method 700 may be implemented as one or more code modules of the software application program 133 resident in the storage module 109 of the camera 100 and being controlled in its execution by the processor 105. The method 700 will be described by way of example with reference to the accumulated cost map 905 of FIG. 9A and the parent map 945 of FIG. 9B.

In the example of FIGS. 9A and 9B, the method 700 searches the maximum-cost path given an upper and lower bound in the accumulated cost map 905.

The method 700 begins at receiving step 710, where the accumulated cost map 905, the parent map 945, an upper bound 975 and lower bound 980 of the middle region 940 are received under execution of the processor 105. The upper bound 975 in the accumulated cost map 905 corresponds to the upper bound 1020 in the frame 1005. Similarly, the lower bound 980 in the accumulated cost map 905 corresponds to the lower bound 1025 in the frame 1005; and the middle region 940 in the accumulated cost map 905 corresponds to the middle region 1095 in the frame 1005.

Then the method 700 proceeds to initialising step 720, where a max-cost buffer (MCB) configured within the memory 106 is initialised to empty. The max-cost buffer (MCB) is configured for storing the collection of pixels along the maximum-cost path between the upper bound 975 and the lower bound 980. Also at step 720, a current row index variable, row_idx, is initialised with the row index of the lower bound 980.

Next, the method 700 proceeds to finding step 730, where a pixel with the maximum accumulated cost along the current row row_idx, is found under execution of the processor 105. For example, the pixel represented by matrix cell 960 with value one thousand-one hundred and ninety one (1191) on row_idx=7 in the accumulated cost map 905 seen in FIG. 9A. The location of the maximum accumulated cost map (ACM) pixel is added to the max-cost buffer (MCB) configured within memory 106. Next, the method 700 proceeds to lookup step 740, where a lookup is performed in the parent map 945 for the parent of the maximum accumulated cost map (ACM) pixel. For the current row_idx=7, the parent location is shown in matrix cell 970 of in FIG. 9B. The matrix cell 970 contains the coordinate value (4,4), which suggests (4,4) is the parent pixel of the pixel represented in matrix cell 960 in the cost map 905.

Next, the method 700 proceeds to appending step 750, where the max-cost buffer (MCB) is appended, under execution of the processor 105, with the parent pixel coordinate of matrix cell 970. Next, the method 700 proceeds to setting step 755, where the current variables, row_idx and p_idx are set to be the parent pixel coordinate P_x and P_y, found in step 750. Then at decision step 760, if the upper bound 975 is reached, then the method 700 proceeds to step 770. Otherwise, the method 700 returns step 740.

If all rows in the region of the accumulated cost map (ACM) 905 (i.e. the middle region 940 in the example of FIG. 9A) are processed, then the path finding process is completed. An example of a resulting continuous path in the example of FIGS. 9A and 9B is illustrated in bold font in FIG. 9B from matrix cell 970 to matrix cell 985, which are coordinates: (4,6), (4,5), (4,4), (4,3), (3,2), (3,1), and (2,0). Next, the method 700 proceeds to determining step 770, where the start pixel for the top region 1090 of the frame 1005 is determined under execution of the processor 105. Then at determining step 780 the start pixel for the bottom region 1099 of the frame 1005 is determined under execution of the processor 105.

Steps 770 and 780 are performed to ensure the continuity of the medial axis path stemming from the middle region 940 of the accumulated cost map (ACM) 905 (i.e., corresponding to the middle region 1095 of the frame 1005). The start pixel of the medial axis for the top region 1090 is the top pixel, as represented by matrix cell 920, of the path of the middle region 940. The start pixel of the medial axis for the bottom region 1099 is the bottom pixel, as represented by matrix cell 960, of the path of the middle region 940.

Now referring back to FIG. 4, in one arrangement, given the start pixels, at both steps 470 and 480, dynamic programming is used with the constraint to search the medial axis paths using the given start pixel (i.e., as represented by matrix cell 920) and 960), respectively. The medial axis 1050 is the concatenation of medial axis paths of the top 1090, middle 1095 and bottom 1099 regions.

Figure 11:
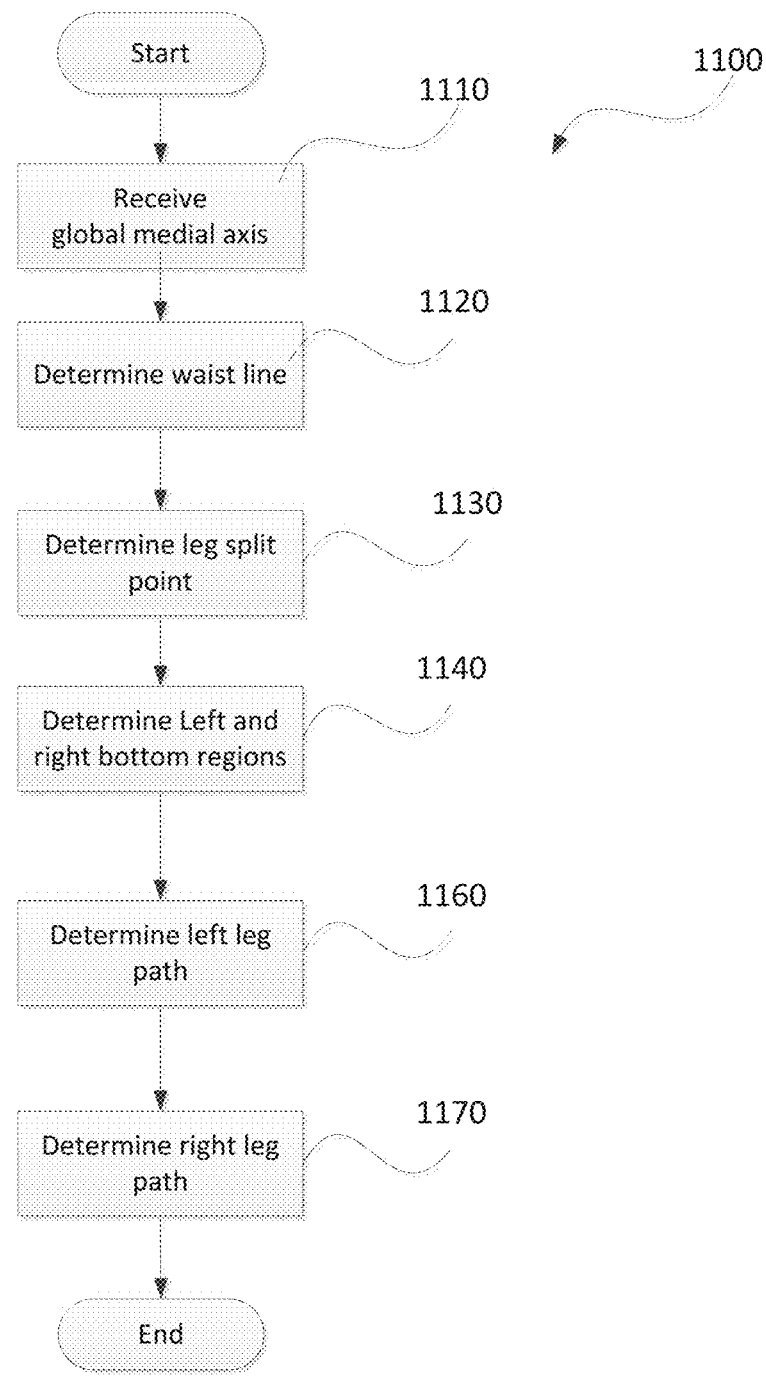
FIG. 11 is a flow diagram showing a method of determining medial axis paths at the bottom half of a target object, as executed in the method of FIG. 3.

The method 1100 of determining medial axis paths at the bottom half of a target object, as executed at step 340, will be described below with reference to FIG. 11. The method 1100 will be described by way of example with reference to the input frame 1005. The method 1100 determines multiple medial axis paths for the bottom half of the input frame 1005.

The method 1100 may be implemented as one or more code modules of the software application program 133 resident in the storage module 109 of the camera 100 and being controlled in its execution by the processor 105.

The method 1100 begins at receiving step 1110, where the medial axis 1050 of the target object 1015 (i.e., the object of interest) which represents an upright person. Then, the method 1100 proceeds to determining step 1120, where a waist line level is determined for the target object 1015 under execution of the processor 105. The row number at the waist line level of the target object 1015 is determined at step 1120. The waist line level is a horizontal line in the frame 1005 (or image) that divides the frame 1005 (or image) vertically to head-plus-torso region and legs region. In one arrangement, a heuristic value representing the head-torso region of the entire image (e.g.: 0.5) being 50%. For example, in an input image of an upright person, such as the frame 1005, with size 128×48 pixels, the waist line level 1030 is expected to be at row sixty four (64).

Next, at determining step 1130, intersection 1045 between medial axis 1050 and the waist line level 1030 is determined under execution of the processor 105. The intersection 1045 corresponds to the pixel location in the medial axis 1050 that has the same row number as the waist line level. The intersection 1045 may be referred to as the "bottom half splitting point" (or simply "split point"). The split point at the intersection of the waist line level 1030 with the medial axis 1050 is determined at step 1130.

Next, at determining step 1140, the bottom half of the input frame 1005 is further divided to left bottom region 1065 and right bottom region 1075. The left bottom region 1065 covers the area below the waist line 1075 and to the left of the medial axis 1050. In frame 1005, the left bottom region 1065 is defined by the quadrilateral from four points 1075, 1045, 1085 and 1080. The right bottom half region 1070 covers the area below the waist line 1075 and to the right of the medial axis 1050.

Next, at determining step 1160, a medial axis for the left leg of the object 1015 is determined within the region 1065 from the split point 1045 down, under execution of the processor 105. The left leg medial axis within the region 1065 is under a constraint that the left leg medial axis starts at the split point 1045 and ends at the bottom image row. The left leg medial axis is a continuous path between two vertical bounds, the continuous path representing the left leg medial axis. The first vertical bound is the split point, and the second vertical bound is the bottom image row. In one arrangement, dynamic programming technique is used to determine the medial axis in left bottom region 1065.

At determining step 1170, a medial axis for the right leg of the object 1015 is determined within region 1070 from the split point 1045 down. The right leg medial axis is a continuous path between two vertical bounds, the continuous path representing the right leg medial axis. The medial axis for the right leg of the object 1015 is determined using dynamic programming starting at the split point 1045.

The medial axis for the left bottom region 1065 is referred to as a left leg path 1055 and the medial axis for the right bottom region 1075 is referred to as a right leg path 1060. The body medial axis together with the leg axes may be collectively referred to as the stickman axes for modelling a human figure with one-dimensional sticks.

The method 1200 of determining the foreground boundary of the target object, as executed at step 350, will be described below with reference to FIG. 12. The method 1200 determines the foreground boundary for the target object 1015 (or object of interest).

The method 1200 may be implemented as one or more code modules of the software application program 133 resident in the storage module 109 of the camera 100 and being controlled in its execution by the processor 105.

Figure 13:
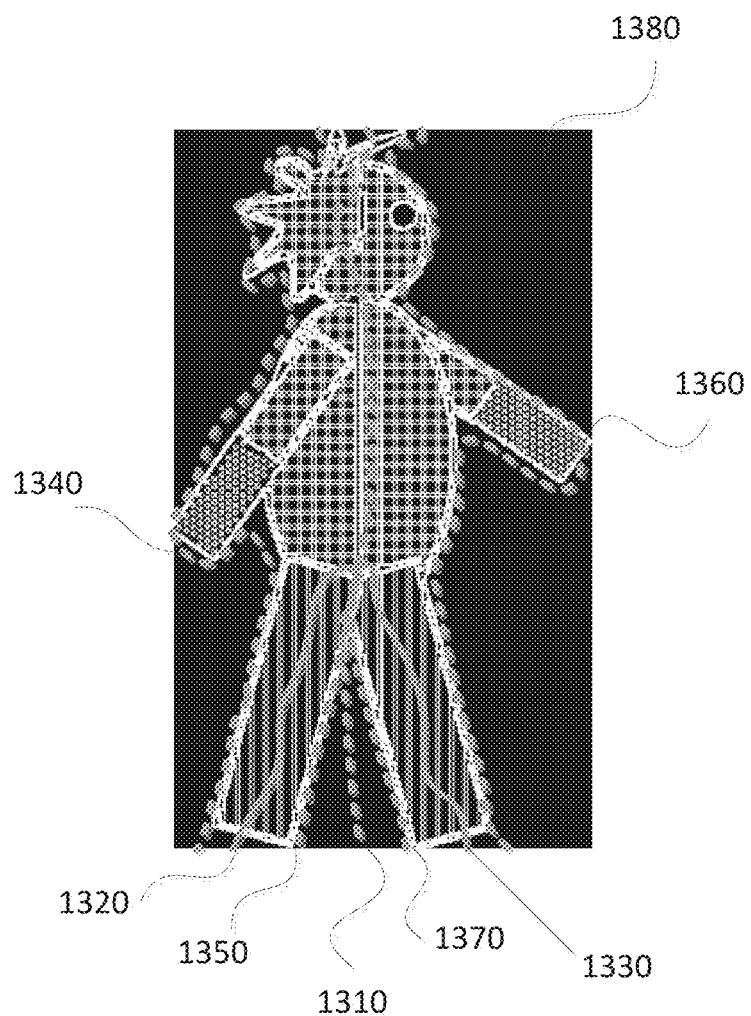
FIG. 13 is a schematic diagram showing an estimated foreground boundary of the target object of FIG. 12.

The method 1200 will be described by way of example with reference the input frame 1005 and to gradient image 1380 of FIG. 13 which is a gradient image for the frame 1005.

The method 1200 begins at determining step 1210, where an edge response image is determined for the input frame 1005, under execution of the processor 105. In one arrangement, the edge response image may be in the form of a gradient image 1380, as shown for example in FIG. 13. The gradient image 1380 may be determined using any suitable method. The determined image 1380 may be stored in the memory 106.

Next, the method 1200 proceeds to receiving steps 1220 and 1230, where a set of medial axes of the object 1015 in the input frame 1005 is received under execution of the processor 105. At receiving step 1220, the medial axis 1050 is received under execution of the processor 105. The medial axis 1050 may be stored in the memory 106.

The method 1200 then proceeds to receiving step 1230 where a continuous path representing the medial axis of the left leg of the object 1015 is received under execution of the processor 105. The continuous path for the left leg is on the left side of the medial axis 1050. The continuous path for the left leg is determined between a first bound (i.e., split point 1045) and a second bound (i.e., bottom image row 980), with the continuous path for the left leg summing up to a maximum total edge response.

Also at step 1230, a continuous path representing the medial axis of the right leg of the object 1015 is received under execution of the processor 105. The continuous path for the right leg is on the right side of the medial axis 1050. The continuous path for the left leg is determined between the first bound (i.e., split point 1045) and the second bound (i.e., bottom image row 980), with the continuous path for the right leg summing up to a maximum total edge response.

Next, the method 1200 proceeds to receiving step 1240, where the split point 1045 is received under execution of the processor 105.

Next, at determining step 1260, a left body boundary is determined under execution of the processor 105. The left body boundary is the outline of the body of the object of interest 1015 (or person of interest) on the left hand side of the medial axis and the left leg path. To find the left body boundary, a search region on the gradient image is formed at step 1260. In FIG. 10, the search region used to determine the left body boundary at step 1260 is the polygon defined by five vertex points 1040, 1043, 1045 (i.e., the split point), 1035 and 1080. A maximum-cost path from top image row 975 to bottom image row 980, within the search region is determined as representing at least a portion of the left body boundary of the object 1015. The left body boundary of the object 1015 also represents a maximum total edge response. In one arrangement, dynamic programming is used to determine the left body boundary path, which is shown as the dotted line 1340 in FIG. 13.

Similarly, at determining step 1270, a right body boundary is determined under execution of the processor 105. The right body boundary is the outline of the body of the target object 1015 (or object of interest) on the right hand side of the medial axis 1050 and the right leg path. A search region for the right body region is formed at step 1270. In FIG. 10, the search region formed at step 1270 is the polygon defined by five vertex points 1043, 1012, 1087, 1033, and 1045. Next, a maximum-cost path from top image row 975 to bottom image row 980 within the search region formed at step 1270 is determined as representing at least a portion of the right body boundary of the object 1015. In one arrangement, dynamic programming is used to determine the right body boundary path, which is shown as the dotted line 1360 in FIG. 13].

Next, at determining step 1280, a left leg inner boundary is determined under execution of the processor 105. In the example of FIG. 13, the left leg inner boundary is the outline of the inner left leg between the left leg medial axis 1320 and the bottom part of the medial axis 1310. A search region for the inner left leg is formed at step 1280. In the example of FIG. 10, the search region is the triangular region defined by three points 1035, 1045 and 1085. A maximum-cost path is determined within the search region determined at step 1280 from the split point to the bottom image row. In one arrangement, dynamic programming is used to determine the inner left leg boundary path, which is shown as the dotted line 1350 in FIG. 13.

Next, at determining step 1290, the right leg inner boundary is determined under execution of the processor 105. The right leg inner boundary is the outline of the inner right leg between right leg medial axis 1330 and the bottom part of the medial axis 1310. A search region for the inner right leg is formed at step 1290. The search region determined at step 1290 is the triangular region defined by three points 1033, 1045 and 1085. Next, a maximum-cost path is determined within the search region determined at step 1290. In one arrangement, dynamic programming is used to determine the inner right leg boundary path, which is shown as the dotted line 1370 in FIG. 13.

Figure 12:
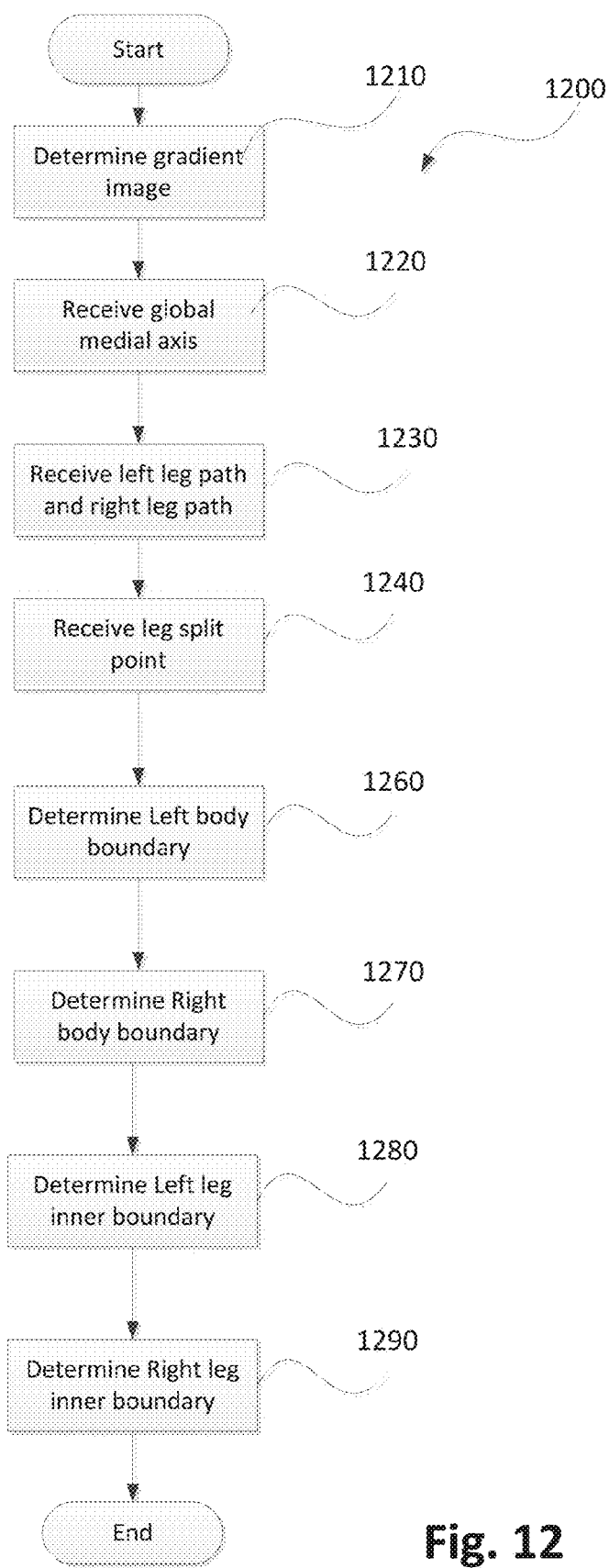
FIG. 12 is a flow diagram showing a method of determining the foreground boundary of the target object.
Figure 14:
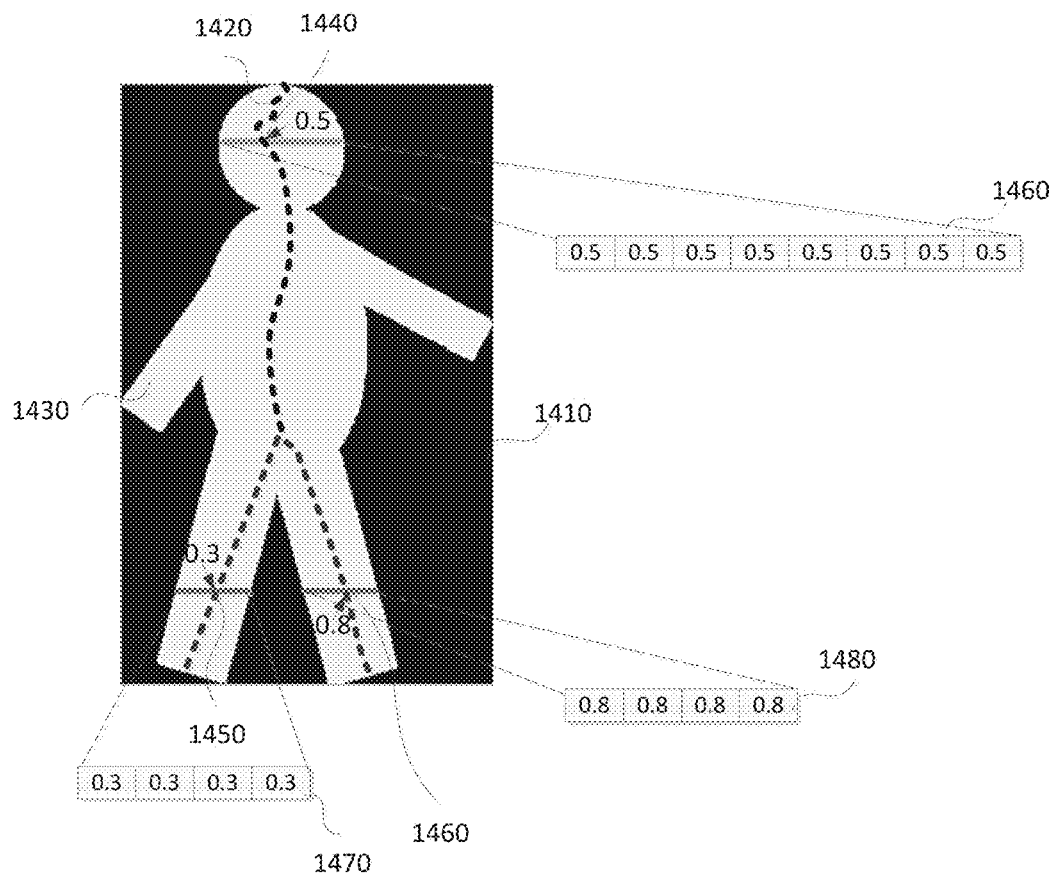
FIG. 14 is a schematic diagram showing the determined foreground boundary of a target object of FIG. 12 and determined confidence map.

The foreground boundary (or "foreground mask") of the target object 1015 determined in the foreground boundary estimation method 1200 described in FIG. 12, is shown in FIG. 14. The white area 1430 of FIG. 14 represents the foreground mask of the object 1015 representing a person in the input frame 1005. The black area of FIG. 14 represents background.

Now returning to FIG. 3, at step 360, confidence values for each pixel in the foreground mask 1430 are determined, as described above. In one arrangement, the confidence values for the entire row within the foreground mask 1430 is assigned to the normalised cross correlation (NCC) score for that row in the medial axis path. For example, in FIG. 14, the pixel location indicated by label 1440 on the medial axis 1420 has a normalised cross correlation (NCC) score 0.5 so the entire row 1460 within the foreground mask 1430 has the same value. Similarly, pixel locations 1450, 1460 have values 0.3 and 0.8, respectively. As a result, the entire row 1470 on the left leg region and the entire row 1480, as seen in FIG. 14, on the right leg region of the foreground mask 1430 has the value 0.3 and 0.8, respectively. As a result, each row in the foreground mask 1430 encodes a value between zero (0) and one (1) representing the confidence level of that row being foreground, if a normalised cross correlation (NCC) value is negative, the negative normalised cross correlation (NCC) value is reset to zero (0).

The described foreground confidence mask 1430 determined using medial axis explores the symmetry nature of foreground objects for target matching purposes. The target objects can be either rigid or non-rigid objects. The continuity of the medial axis paths provides robustness against pose and posture variation. The method of determining object medial axes as described above does not require a foreground mask a priori. The determined foreground mask encodes a confidence score per scan line, allowing the matching process to discriminate strong confident foreground areas from weak foreground areas in the foreground mask.

Target matching can be performed on the extracted medial axes and the confidence score (i.e. normalised cross correlation (NCC) score) along the extracted medial axes. Image colour values along the medial axis may be extracted to a medial axis profile. The medial axis profiles may then be resampled to a common scale to account for different scaling between the two target objects. Once at a common size, the medial axis profiles from different target objects can be compared either using sum of squared differences or by correlation. If the confidence scores along the medial axes are available, the confidence scores can be used as weights in a weighted sum of squared differences or weighted correlation.

Target matching can also be performed on a pose-normalised image of the target objects. Objects in multiple input images may be matched using pose-normalised images and foreground confidence masks. As can be seen in FIG. 14, body medial axis 1420 is generally curved along the human posture. The leg medial axes can also be non-symmetric about the body medial axis 1420 because each leg may be raised at different height during walking. Due to different poses, images of the same target may not match well when taking a sum of squared differences (SSE) or normalised cross correlation (NCC). To factor out differences in poses before target matching, the input images may be warped to a canonical pose or canonical formation. The described methods may be configured for translating each image row to align the medial axes for the left and right leg to a canonical pose or canonical formation. The canonical pose is characterised by a vertically straight body medial axis at the middle of the image. The leg medial axes are straight and symmetric about the body medial axis, each at a 10-degree angle with respect to the body medial axis. The canonical pose also has the leg split point at the same location, for example, at 50% height of the image. Images of the target object are also scaled isotropically (i.e. equal scaling factor in both x- and y-axis) to a common size (e.g. 128×48 pixels) to facilitate image matching. The warped images can then be matched using either sum of squared differences (SSE) or normalised cross correlation (NCC). The warping of a target image to a canonical pose may be performed by translating each image row horizontally so that the body medial axis aligns with the middle image column. The image is padded with repeated intensities at border if necessary. The left half of image rows below the leg split point may then be translated horizontally so that the left leg medial axis aligns with the left leg axis in the canonical pose (i.e. at 10-degree angle with respect to the body medial axis). Similarly, intensities may be repeated at image border if necessary. The right half of image rows below the leg split point may then be translated horizontally so that the right leg medial axis aligns with the right leg axis in the canonical pose.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

The invention claimed is:

1. A method of determining a boundary of an object in an input image, the method comprising:
   determining a set of vertical medial axes of the object in the input image, at least a portion of at least one of the vertical medial axes being curved following a shape of the object;

determining an edge response image for the input image using the vertical medial axes; and determining a continuous path on at least one side of the vertical medial axes, at least one vertical medial axis of the vertical medial axes and the continuous path extending at least from a first vertical bound to a second vertical bound, and the continuous path summing up to a maximum total edge response and representing at least a portion of the boundary of the object.

2. The method according to claim 1, further comprising determining a foreground mask of the object using the boundary.

3. The method according to claim 1, further comprising determining a foreground confidence mask of the object using a confidence score.

4. A system for determining a boundary of an object in an input image, the system comprising:
- a memory for storing data and a computer program;
- a processor coupled to the memory for executing the computer program, the computer program comprising instructions for:
- determining a set of vertical medial axes of the object in the input image, at least a portion of at least one of the vertical medial axes being curved following a shape of the object;
- determining an edge response image for the input image using the vertical medial axes; and
- determining a continuous path on at least one side of the vertical medial axes, at least one vertical medial axis of the vertical medial axes and the continuous path extending at least from a first vertical bound to a second vertical bound, and the continuous path summing up to a maximum total edge response and representing at least a portion of the boundary of the object.

5. An apparatus for determining a boundary of an object in an input image, the apparatus comprising:
- means for determining a set of vertical medial axes of the object in the input image, at least a portion of at least one of the vertical medial axes is curved following a shape of the object;
- means for determining an edge response image for the input image using the vertical medial axes; and
- means for determining a continuous path on at least one side of the vertical medial axes, at least one vertical medial axis of the vertical medial axes and the continuous path extending at least from a first vertical bound to a second vertical bound, and the continuous path summing up to a maximum total edge response and representing at least a portion of the boundary of the object.

6. A non-transitory computer readable medium having stored thereon at least one computer program for causing a processor to execute a method for determining a boundary of an object in an input image, the method comprising:
- determining a set of vertical medial axes of the object in the input image, at least a portion of at least one of the vertical medial axes is curved following a shape of the object;
- determining an edge response image for the input image using the vertical medial axes; and
- determining a continuous path on at least one side of the medial axes, at least one vertical medial axis of the vertical medial axes and the continuous path extending at least from a first vertical bound to a second vertical bound, and the continuous path summing up to a maximum total edge response and representing at least a portion of the boundary of the object.

7. The method according to claim 1, wherein a maximum-cost path represents at least a portion of the boundary of the object.

8. The method according to claim 1, wherein at least one portion of the boundary of the object on at least one side of the vertical medial axis and the continuous path extend from the first vertical bound to the second vertical bound.

9. The method according to claim 1, wherein at least a portion of the boundary of the object extends between the vertical medial axis and a second vertical medial axis of the object.

10. The method according to claim 1, wherein the continuous path, the vertical medial axis of the object and at least a portion of the boundary of the object extend at least from the first vertical bound to the second vertical bound.

11. The method according to claim 1, wherein the object is located between the first vertical bound and the second vertical bound.

* * * * *